(12) United States Patent
Lindholm et al.

(10) Patent No.: US 10,452,387 B2
(45) Date of Patent: Oct. 22, 2019

(54) SYSTEM AND METHOD FOR PARTITION-SCOPED PATCHING IN AN APPLICATION SERVER ENVIRONMENT

(71) Applicant: ORACLE INTERNATIONAL CORPORATION, Redwood Shores, CA (US)

(72) Inventors: Jacob Lindholm, Burlington, MA (US); Joshua Dorr, San Jose, CA (US); Yamini K Balasubramanyam, Bangalore (IN); Nazrul Islam, Santa Clara, CA (US); Rajiv Mordani, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/706,233

(22) Filed: Sep. 15, 2017

(65) Prior Publication Data

US 2018/0081676 A1    Mar. 22, 2018

Related U.S. Application Data

(60) Provisional application No. 62/395,954, filed on Sep. 16, 2016, provisional application No. 62/396,066, (Continued)

(51) Int. Cl.
*G06F 9/44* (2018.01)
*G06F 8/656* (2018.01)
(Continued)

(52) U.S. Cl.
CPC .............. *G06F 8/656* (2018.02); *G06F 8/65* (2013.01); *G06F 8/71* (2013.01); *H04L 65/1063* (2013.01);
(Continued)

(58) Field of Classification Search
None
See application file for complete search history.

(56) References Cited

U.S. PATENT DOCUMENTS 10,055,219 B1 * 8/2018 Olderdissen ............ G06F 8/654
2001/0047276 A1   11/2001 Eisenhart
(Continued)

FOREIGN PATENT DOCUMENTS

| GB | 2510874 | 8/2014 |
| WO | 0078004 | 12/2000 |

(Continued)

OTHER PUBLICATIONS

Gil, David, "What's New in WebLogic 12c", published Jun. 12, 2014, https://www.slideshare.net/OracleMKTPR20/novedades-de-weblogic-12cdavid-sanz, Oracle, 41 pages.

(Continued)

*Primary Examiner* — Insun Kang
(74) *Attorney, Agent, or Firm* — Tucker Ellis LLP

(57) ABSTRACT

In accordance with an embodiment, described herein are a system and method for partition-scoped patching in an application server environment. A computer environment includes an application server, for example a multitenant application server, that supports the use of one or more partitions, wherein each partition provides an administrative and runtime subdivision of a domain. During a partition-scoped rollout of a patch or update, to a resource group or application within a plurality of servers or clusters of servers, the resource group or application can be updated within a targeted partition, using a patch orchestrator and partition lifecycle runtime interface, without affecting the operation of other partitions at those servers or clusters of servers. One or more session handling flags can be used, to enable sessions and/or requests that are associated with the (Continued)

targeted partition, to be handled by a traffic director, during the patching process.

12 Claims, 6 Drawing Sheets

Related U.S. Application Data filed on Sep. 16, 2016, provisional application No. 62/445,613, filed on Jan. 12, 2017.

(51) Int. Cl.
*G06F 8/65* (2018.01)
*G06F 8/71* (2018.01)
*H04L 29/08* (2006.01)
*H04L 29/06* (2006.01)

(52) U.S. Cl.
CPC ............ *H04L 67/14* (2013.01); *H04L 67/32* (2013.01); *H04L 67/34* (2013.01); *H04L 69/22* (2013.01)

(56) References Cited

U.S. PATENT DOCUMENTS

| | | | | |
|---|---|---|---|---|
| 2003/0074426 | A1* | 4/2003 | Dervin | G06F 8/60 709/220 |
| 2007/0055781 | A1* | 3/2007 | Fleischer | H04L 67/14 709/227 |
| 2008/0022380 | A1* | 1/2008 | Lu | G06F 8/65 726/9 |
| 2009/0144720 | A1* | 6/2009 | Roush | G06F 8/65 717/171 |
| 2009/0187899 | A1* | 7/2009 | Mani | G06F 8/65 717/168 |
| 2009/0241100 | A1* | 9/2009 | Sakurai | G06F 11/1433 717/170 |
| 2009/0259999 | A1 | 10/2009 | Srinivasan | |
| 2009/0300093 | A1* | 12/2009 | Griffiths | G06F 9/5055 709/202 |
| 2010/0162226 | A1* | 6/2010 | Borissov | G06F 8/65 717/173 |
| 2011/0138374 | A1 | 6/2011 | Pal | |
| 2011/0161949 | A1 | 6/2011 | Kodaka | |
| 2011/0213870 | A1 | 9/2011 | Cai et al. | |
| 2011/0321031 | A1* | 12/2011 | Dournov | G06F 8/65 717/171 |
| 2012/0054732 | A1* | 3/2012 | Jain | G06F 8/65 717/171 |
| 2012/0102480 | A1* | 4/2012 | Hopmann | G06F 8/656 717/172 |
| 2012/0227116 | A1 | 9/2012 | Huang et al. | |
| 2013/0031403 | A1 | 1/2013 | Mordani et al. | |
| 2013/0067493 | A1* | 3/2013 | Dion | G06F 9/4843 719/318 |
| 2013/0262689 | A1 | 10/2013 | Schmidt et al. | |
| 2013/0268920 | A1 | 10/2013 | Ursal et al. | |
| 2013/0275819 | A1 | 10/2013 | Banerjee et al. | |
| 2013/0326494 | A1* | 12/2013 | Nunez | H04L 41/082 717/172 |
| 2014/0173566 | A1* | 6/2014 | Hsu | G06F 8/65 717/124 |
| 2014/0344337 | A1* | 11/2014 | Sramka | H04L 67/10 709/203 |
| 2015/0207758 | A1* | 7/2015 | Mordani | H04L 47/78 709/226 |
| 2016/0094647 | A1* | 3/2016 | Mordani | H04L 47/70 709/226 |
| 2016/0378453 | A1* | 12/2016 | Kalidindi | G06F 8/65 717/173 |
| 2017/0142228 | A1* | 5/2017 | Byrne | H04L 67/34 |
| 2017/0222910 | A1* | 8/2017 | Cai | H04L 43/16 |
| 2018/0026849 | A1* | 1/2018 | Guim Bernat | H04L 47/805 709/223 |

FOREIGN PATENT DOCUMENTS

| | | |
|---|---|---|
| WO | 2011162991 | 12/2011 |
| WO | 2012054160 | 4/2012 |

OTHER PUBLICATIONS

United States Patent and Trademark Office, Office Action dated Mar. 16, 2018 for U.S. Appl. No. 15/204,351, 16 Pages.
United States Patent and Trademark Office, Notice of Allowance dated Aug. 30, 2018 For U.S. Appl. No. 15/204,351, 15 Pages.
"Introducing WebLogic Server 12c", An Oracle White Paper, Jan. 2012, 17 pages.
"Oracle Enterprise Manager Concepts", 11g Release 11.1.0.1, Apr. 2010, 260 pages.
United States Patent and Trademark Office, Notice of Allowance dated May 21, 2018 for U.S. Appl. No. 15/466,267, 14 Pages.
United States Patent and Trademark Office, Notice of Allowance dated Jan. 24, 2019 For U.S. Appl. No. 15/466,267, 21 Pages.
United States Patent and Trademark Office, Notice of Allowance dated Apr. 10, 2019 For U.S. Appl. No. 15/890,601, 20 Pages.

* cited by examiner

SYSTEM AND METHOD FOR PARTITION-SCOPED PATCHING IN AN APPLICATION SERVER ENVIRONMENT

CLAIM OF PRIORITY

This application claims the benefit of priority to U.S. Provisional Patent Application titled "SYSTEM AND METHOD FOR SUPPORTING PATCHING IN AN APPLICATION SERVER ENVIRONMENT", Application No. 62/395,954, filed Sep. 16, 2016; U.S. Provisional Patent Application titled "SYSTEM AND METHOD FOR ENTERPRISE JAVA CLOUD ENVIRONMENT", Application No. 62/396,066, filed Sep. 16, 2016; and U.S. Patent Application titled "SYSTEM AND METHOD FOR ENTERPRISE JAVA CLOUD ENVIRONMENT", Application No. 62/445,613, filed Jan. 12, 2017; which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application server, cloud, or other computing environments, and are particularly related to a system and method for partition-scoped patching in an application server environment.

CROSS-REFERENCE TO RELATED APPLICATIONS

This application is related to U.S. Patent Applications titled "SYSTEM AND METHOD FOR SUPPORTING PATCHING IN A MULTITENANT APPLICATION SERVER ENVIRONMENT", application Ser. No. 14/864,695, filed Sep. 24, 2015; "SYSTEM AND METHOD FOR PROVIDING AN END-TO-END LIFECYCLE IN A MULTITENANT APPLICATION SERVER ENVIRONMENT", application Ser. No. 14/864,725, filed Sep. 24, 2015; and "SYSTEM AND METHOD FOR SESSION HANDLING IN A MULTITENANT APPLICATION SERVER ENVIRONMENT", application Ser. No. 15/204,351, filed Jul. 7, 2016, each of which above applications are herein incorporated by reference.

BACKGROUND

In application server, cloud, or other computing environments, a common task for a system administrator is the need to patch or otherwise update a particular application, perhaps from a first version to a second version. To address this, the administrator may need to perform a series of steps on each server node within a domain, in order to rollout the patch, while trying to minimize application downtime.

However, in a shared application server environment, for example one that supports multitenancy, each server may be acting as a shared resource, for use by several tenants, and shutting down a server to update a particular application may cause the patch rollout for one tenant to affect the operation of another tenant. These are some example of the types of environments in which embodiments of the invention can be used.

SUMMARY

In accordance with an embodiment, described herein are a system and method for partition-scoped patching in an application server environment. A computer environment includes an application server, for example a multitenant application server, that supports the use of one or more partitions, wherein each partition provides an administrative and runtime subdivision of a domain. During a partition-scoped rollout of a patch or update, to a resource group or application within a plurality of servers or clusters of servers, the resource group or application can be updated within a targeted partition, using a patch orchestrator and partition lifecycle runtime interface, without affecting the operation of other partitions at those servers or clusters of servers. One or more session handling flags can be used, to enable sessions and/or requests that are associated with the targeted partition, to be handled by a traffic director, during the patching process.

DETAILED DESCRIPTION

As described above, in a shared application server environment, for example one that supports multitenancy, each server may be acting as a shared resource, for use by several tenants, and shutting down a server to update a particular application may cause the patch rollout for one tenant to affect the operation of another tenant.

In accordance with an embodiment, described herein are a system and method for partition-scoped patching in an application server environment. A computer environment includes an application server, for example a multitenant application server, that supports the use of one or more partitions, wherein each partition provides an administrative and runtime subdivision of a domain. During a partition-scoped rollout of a patch or update, to a resource group or application within a plurality of servers or clusters of servers, the resource group or application can be updated within a targeted partition, using a patch orchestrator and partition lifecycle runtime interface, without affecting the operation of other partitions at those servers or clusters of servers. One or more session handling flags can be used, to enable sessions and/or requests that are associated with the targeted partition, to be handled by a traffic director, during the patching process.

Application Server Environment

Figure 1:
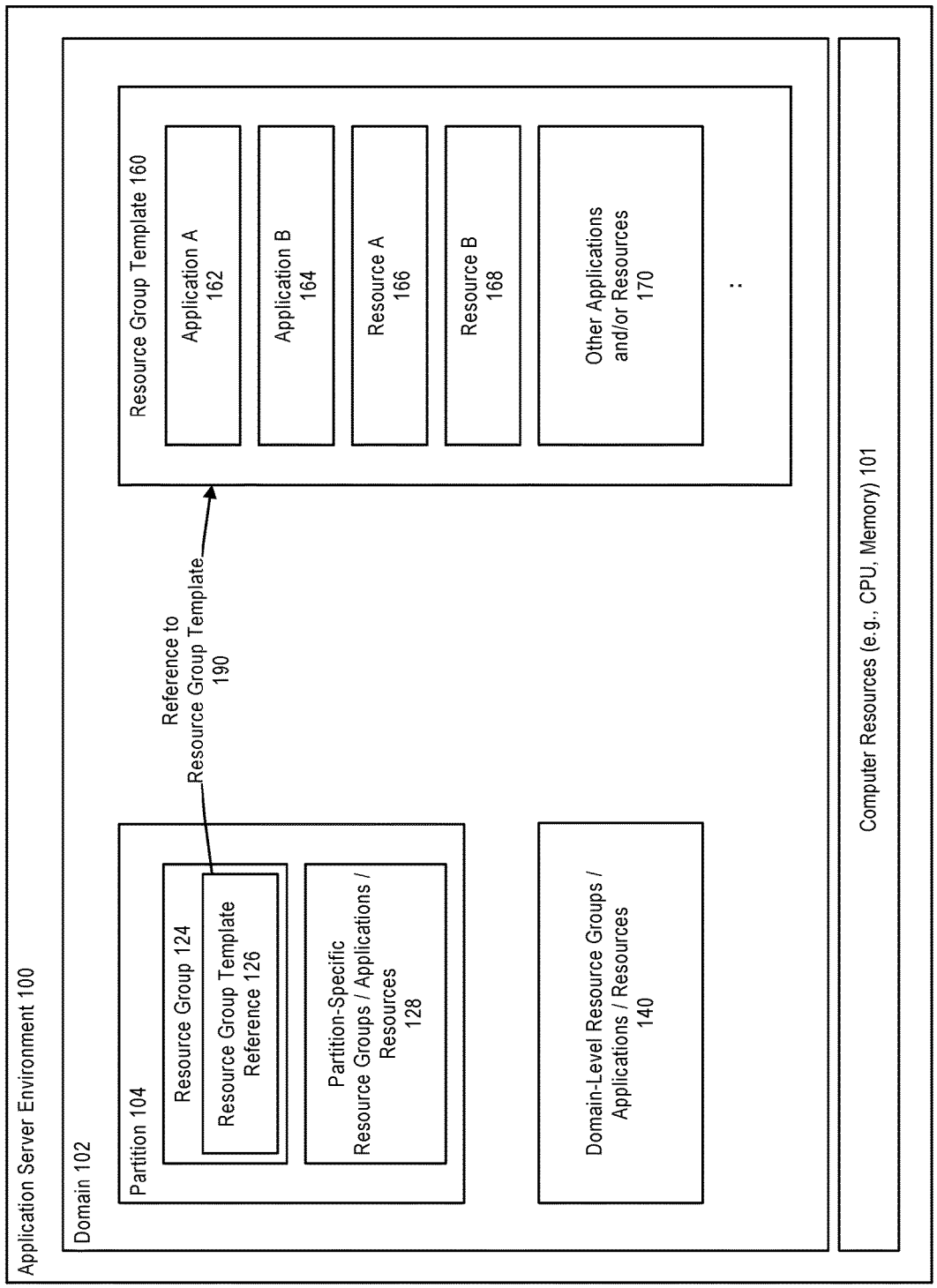
FIG. 1 illustrates a system that includes an application server, cloud, or other environment, in accordance with an embodiment.

FIG. 1 illustrates a system that includes an application server, cloud, or other environment, in accordance with an embodiment.

As illustrated in FIG. 1, in accordance with an embodiment, a system can include, for example, computer resources 101 (e.g., processor/CPU and memory), and an application server (e.g., multitenant/multi-tenant, MT, WebLogic/WLS) environment 100, or other computing environment which enables the deployment and execution of software applications, and can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
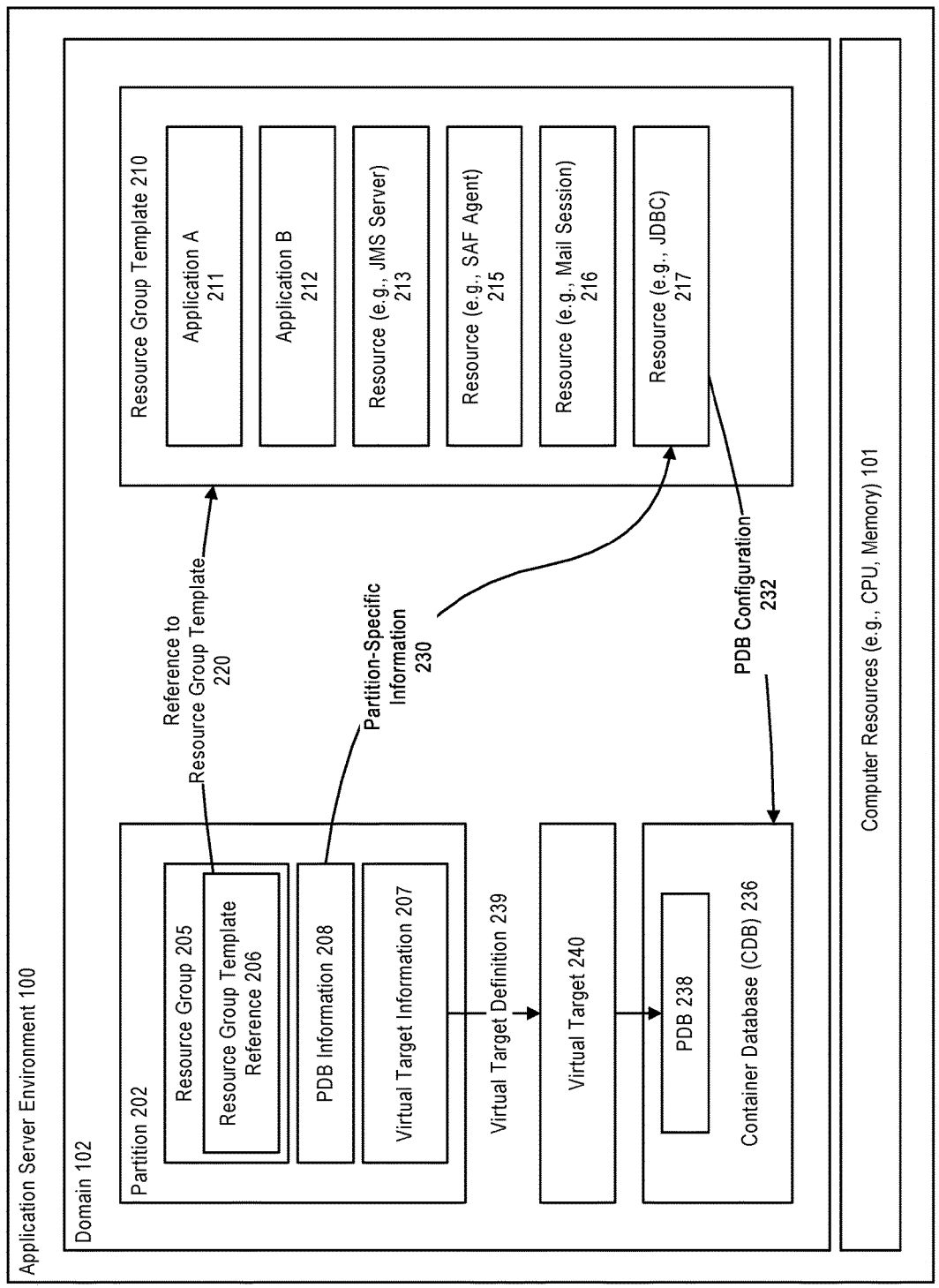
FIG. 2 further illustrates a system that includes an application server, cloud, or other environment, in accordance with an embodiment.

FIG. 2 further illustrates a system that includes an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource indicator (URI), e.g., http://baylandurgentcare.com.

Figure 3:
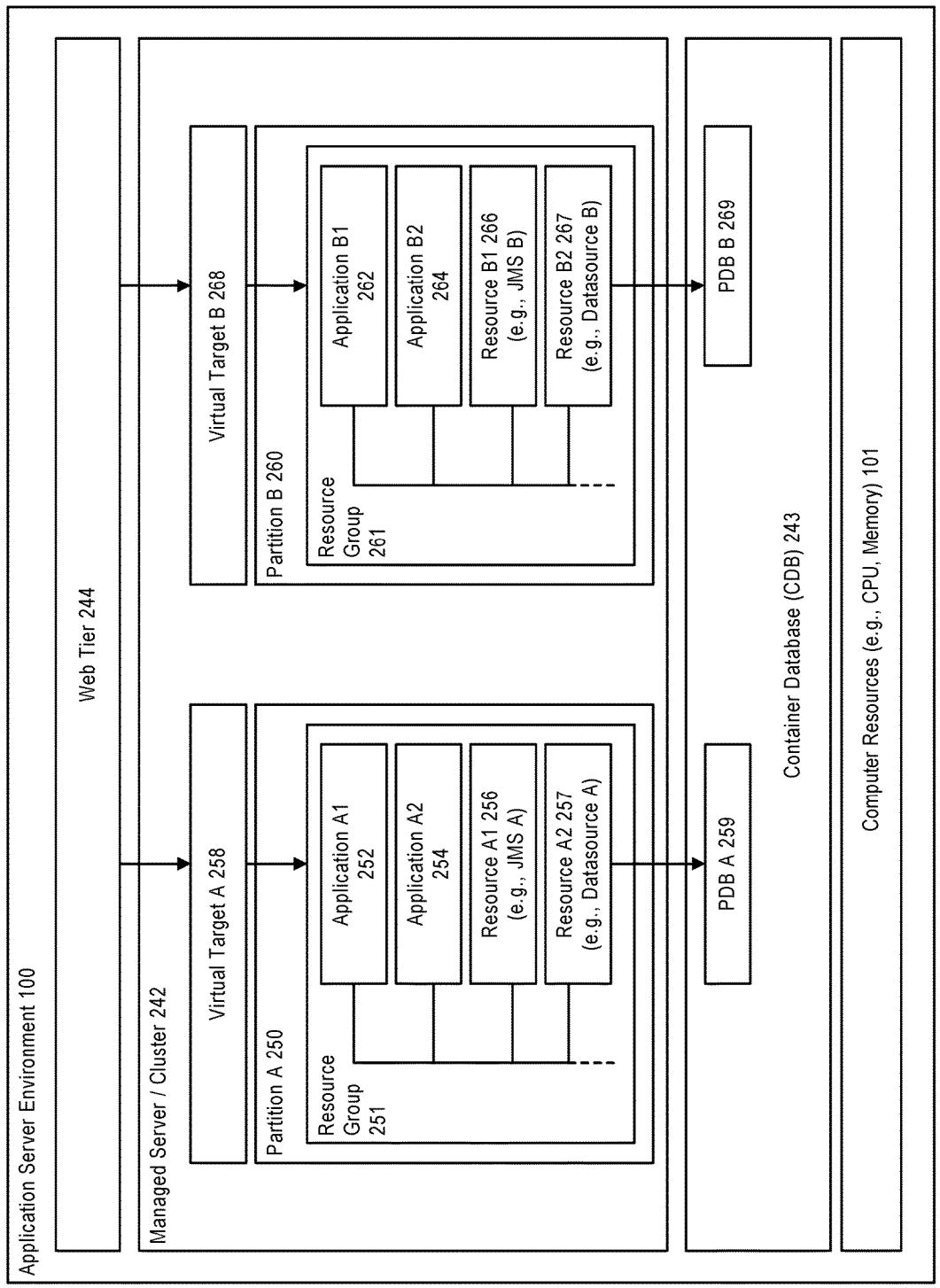
FIG. 3 further illustrates a system that includes an application server, cloud, or other environment, in accordance with an embodiment.

FIG. 3 further illustrates a system that includes an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates. Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications. For example, tenants can represent distinct user organizations, such as different external companies, or different departments within a particular enterprise (e.g., HR and Finance departments), each of which can be associated with a different partition.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

Partition-Scoped Patching

In accordance with an embodiment, the system can support partition-scoped patching in an application server environment. During a partition-scoped rollout of a patch or update, to a resource group or application within a plurality of servers or clusters of servers, the resource group or application can be updated within a targeted partition, using a patch orchestrator and partition lifecycle runtime interface, without affecting the operation of other partitions at those servers or clusters of servers. One or more session handling flags can be used, to enable sessions and/or requests that are associated with the targeted partition, to be handled by a traffic director, during the patching process.

For example, a system or partition administrator may want to patch or otherwise update a particular resource group or application, perhaps from a first version to a second version. However, in a shared application server environment, for example one that supports multitenancy, each server may be acting as a shared resource, for use by several tenants, and shutting down a server to update a particular application may cause the patch rollout for one tenant to affect the operation of another tenant.

To address this, in accordance with an embodiment, the system can perform a partition-scoped rollout of a patch, to patch or otherwise update a resource group or application, for example from a first version to a second version, without affecting other partitions at those servers, by identifying those partitions that need to be updated, and then gracefully shutting down, updating, and restarting only those partitions and the instances of the resource group and application included therein.

Figure 4:
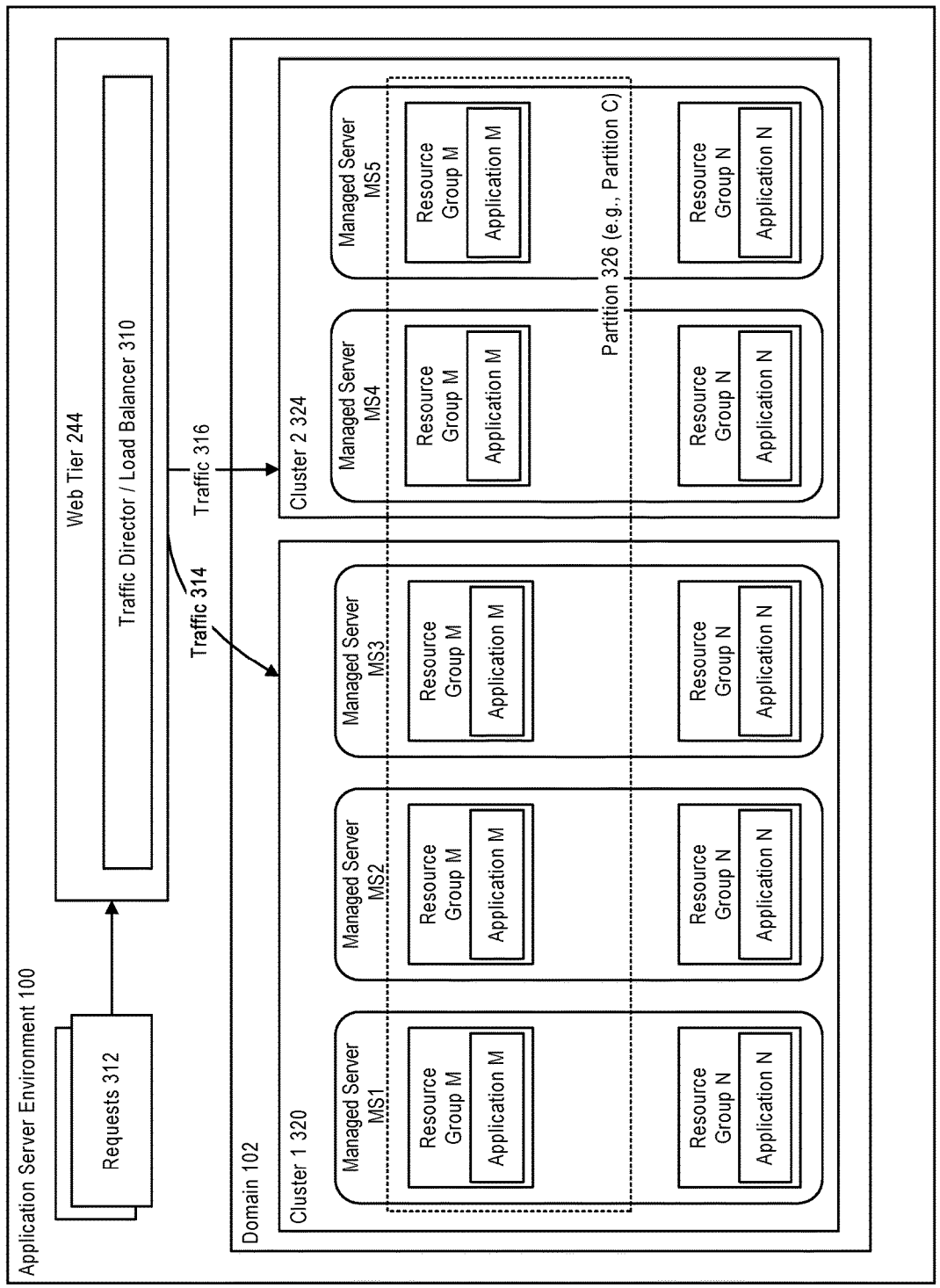
FIG. 4 illustrates the use of a traffic director in an application server, cloud, or other environment, in accordance with an embodiment.

FIG. 4 illustrates the use of a traffic director in an application server, cloud, or other environment, in accordance with an embodiment.

As illustrated in FIG. 4, in accordance with an embodiment, the web tier can include a traffic director 310 (e.g., an Oracle Traffic Director (OTD) instance) that operates as a load balancer to receive requests 312 directed to particular partitions, and communicate those requests, as traffic 314, 316, to one or more servers or clusters of servers 320, 324 that include those partitions, as appropriate.

In accordance with an embodiment, each cluster can include a plurality of managed servers (here indicated as servers MS1-MS5), and can support the use of one or more partition 326 (here indicated as partition C) that is associated with a resource group or application (here indicated as resource group M and application M).

In accordance with an embodiment, other resource groups or applications (here indicated as resource group N and application N) may also be provided on the same servers (MS1-MS5), but may either not be associated with, for example, partition C; and instead may be associated with other partitions, or provided as global resource groups or applications.

In some environments, when a managed server becomes unavailable for some reason, for example due to a system failure/failover, or during a patching process, the traffic director can receive information indicative of that server's unavailability, and attempt to contact another server to process requests, depending on the configuration of the traffic director.

For example, in some environments, the traffic director can be configured so that if, while processing a request within a particular session, the traffic director receives a deserialization error indicative of a managed server's unavailability to process the request, the traffic director can retry the request, based on the request's header information, to a different server, which can then attempt to fetch an appropriate session information, and respond to the request.

Generally, during the patching of a managed server, the traffic director is informed, through direct communication by a patch orchestrator, or the propagation of session-handling flags, to not send any requests to the server being updated, and instead send those requests to other (available) servers. When the server has been updated, the traffic director can be informed of its updated availability status.

However, as described above, in a shared application server environment, for example one that supports multi-tenancy, each server may be acting as a shared resource, for use by several tenants, and shutting down a server to update a particular application may cause the patch rollout for one tenant to affect the operation of another tenant.

Figure 5:
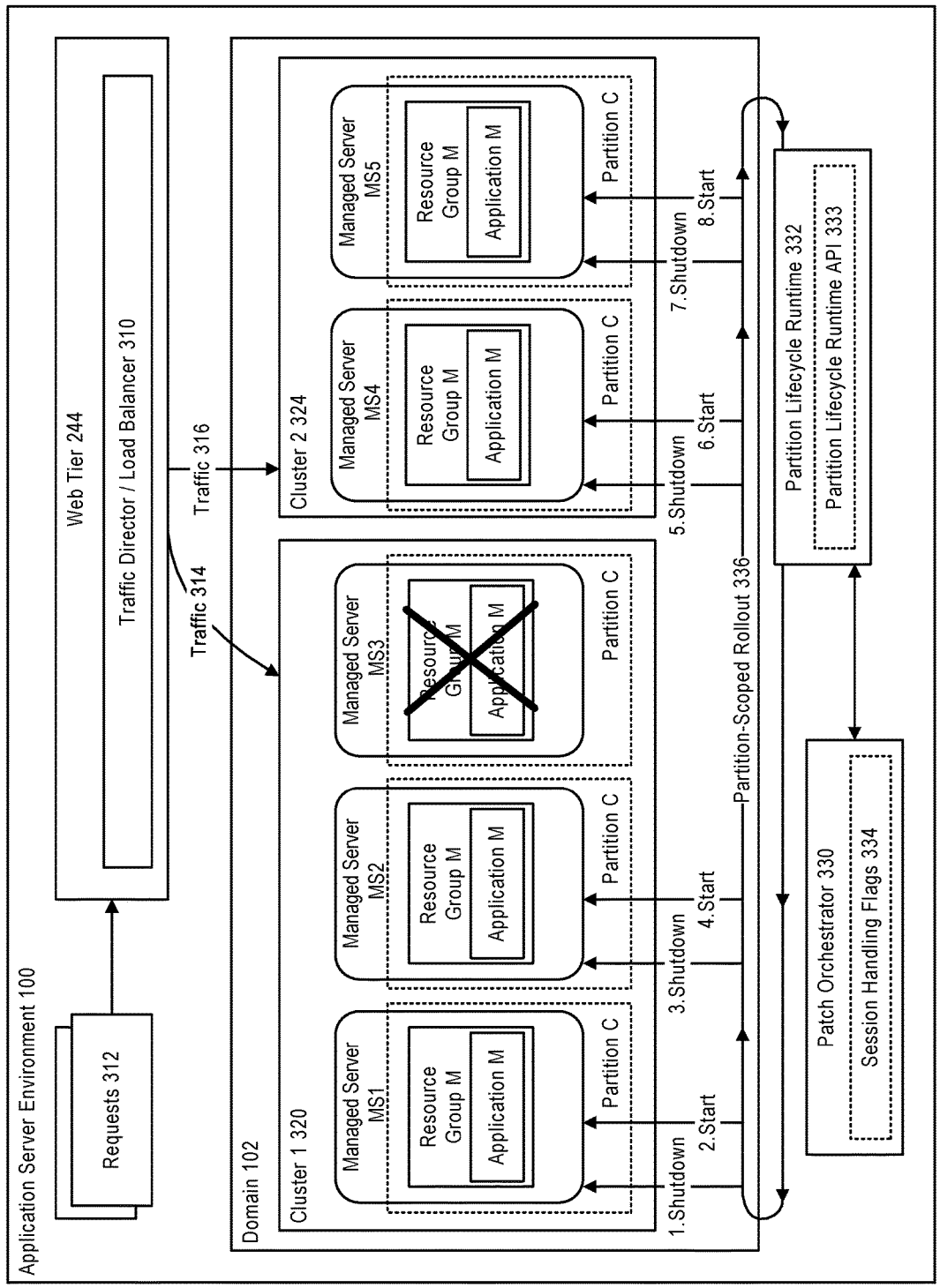
FIG. 5 illustrates partition-scoped patching in an application server, cloud, or other environment, in accordance with an embodiment.

FIG. 5 illustrates partition-scoped patching in an application server, cloud, or other environment, in accordance with an embodiment.

In accordance with an embodiment, the system can include a patch orchestrator 330 which can patch a server, or a partition at a server, using a plurality of patching primitives as further described below, as part of a patching process or patching workflow.

In accordance with an embodiment, the patch orchestrator can communicate with a partition lifecycle runtime 332 associated with a targeted partition, via a partition lifecycle runtime interface (API) 333 that allows for graceful shutdown, start, or other operations on partitions, to perform, as part of a partition-scoped rollout 336, one or more patches or updates, for example to update a particular resource group or application from a first version to a second version, as part of the patching workflow.

In accordance with an embodiment, examples of the types of patching primitives supported by the patch orchestrator can include, for example: quiesce server, which communicates with a traffic director to quiesce traffic to a specified server; and activate server, which communicates with the traffic director to resume sending traffic to a specified server.

As illustrated in FIG. 5, in accordance with an embodiment, a partition-scoped rollout of, for example, a patch or update to resource group M or application M, at partition C, perhaps from a first version to a second version, can be performed, at a first server that includes the targeted partition (e.g., MS1): shutting down the targeted partition (1), and then patching or otherwise updating the version of the resource group or application on that partition and restarting the server (2).

In accordance with an embodiment, the partition-scoped rollout can then proceed to patch or otherwise update the next server that is associated with the targeted partition (e.g., MS2), including repeating the above steps (3, 4) to refresh its partition with the updated resource group or application; and then proceed further to the next servers, or cluster of servers that are associated with the targeted partition (e.g., MS4, MS5), where the above steps are again repeated (5,6,7,8) to refresh their partitions with the updated resource group or application.

In accordance with an embodiment if, during the partition-scoped rollout, a particular server is determine to be not running (e.g., MS3), this implies the targeted partition on that server is similarly not running, and that server can be skipped.

In accordance with an embodiment, since at each server there may also be an application data associated with a current or active session, when the targeted partition is shut down at that server, the system can ensure that session information is available at another server. For example, one or more session handling flags 334 can be used, so that session information can be propagated within the system during the partition-scoped rollout, including to the traffic director, so that he system can then use session-handling features as appropriate, for the server being updated.

For example, in accordance with an embodiment, partition resources can be targeted via virtual targets that are known to the traffic director. The partition-scoped rollout can be used to trigger a resource group graceful shutdown on one server at a time, in order to support failover of incoming requests, session migration, or other methods of seamlessly handling application traffic.

A technical advantage of the above is that a partition's contents, including one or more resource groups or applications, can be patched or otherwise updated, without requiring a server shutdown in order to perform the update, while allowing for additional high-availability (HA) features, such as, for example, propagation of session information.

In accordance with an embodiment, a redeploy operation triggers a complete session invalidation, which can be used to clear internal application cache files and ensure an application is fully reloaded upon restart, and to remove backup copies of the session on other servers within the cluster.

In accordance with an embodiment, since during a partition-scoped rollout to an application, the updated source must be available to be consumed by each node/server that includes the targeted partition, a partition user file system can be provided, for use by partition administrators to, for example, upload and maintain partition-related artifacts that will be used during partition-scoped patching.

System Administrator-initiated Partition-Scoped Rollout

In accordance with an embodiment, when initiated by a system administrator, given an indication (e.g., name) of a targeted partition, the following process can be used to update and restart the targeted partition at a plurality of servers or clusters of servers:

Determine virtual targets defined for the targeted partition.

For each virtual target, determine a list of physical targets, for example, servers or clusters of servers.

Remove from the list any servers that are not running (since a non-running server implies the targeted partition on that server is not running).

Verify there are at least two servers, each with a running targeted partition, on the list; if not, the patch partition-scoped rollout will not proceed.

Get the partition life cycle runtime.

For each server, targeted partition, shutdown the partition on that server, and apply the patch or update.

Start the (updated) targeted partition on that server.

If the system includes a domain model that contains topology information on a per-node basis, the above-described process can be modified to use the domain model to verify that there are at least two servers with a running targeted partition; and then, for each node, server, targeted partition, shutdown and update the targeted partition on that server; and start the (updated) targeted partition on that server.

Partition Administrator-initiated Partition-Scoped Rollout

In accordance with an embodiment, when initiated by a partition administrator, the process used to update and restart the targeted partition at a plurality of servers or clusters of servers is similar, with some restrictions imposed by the partition administrators access rights, and also that the actions are performed within a domain component invocation context (CIC) that provides a context associated with, for example, a current partition administrator and/or current partition:

Get the domain component invocation context (CIC).

Verify (using the domain model) there are at least two servers, each with a running targeted partition, on the list; if not, the patch partition-scoped rollout will not proceed.

For each node, server, targeted partition, shutdown the partition on that server, and apply the patch or update.

Start the (updated) targeted partition on that server.

Partition-Scoped Patching Process

Figure 6:
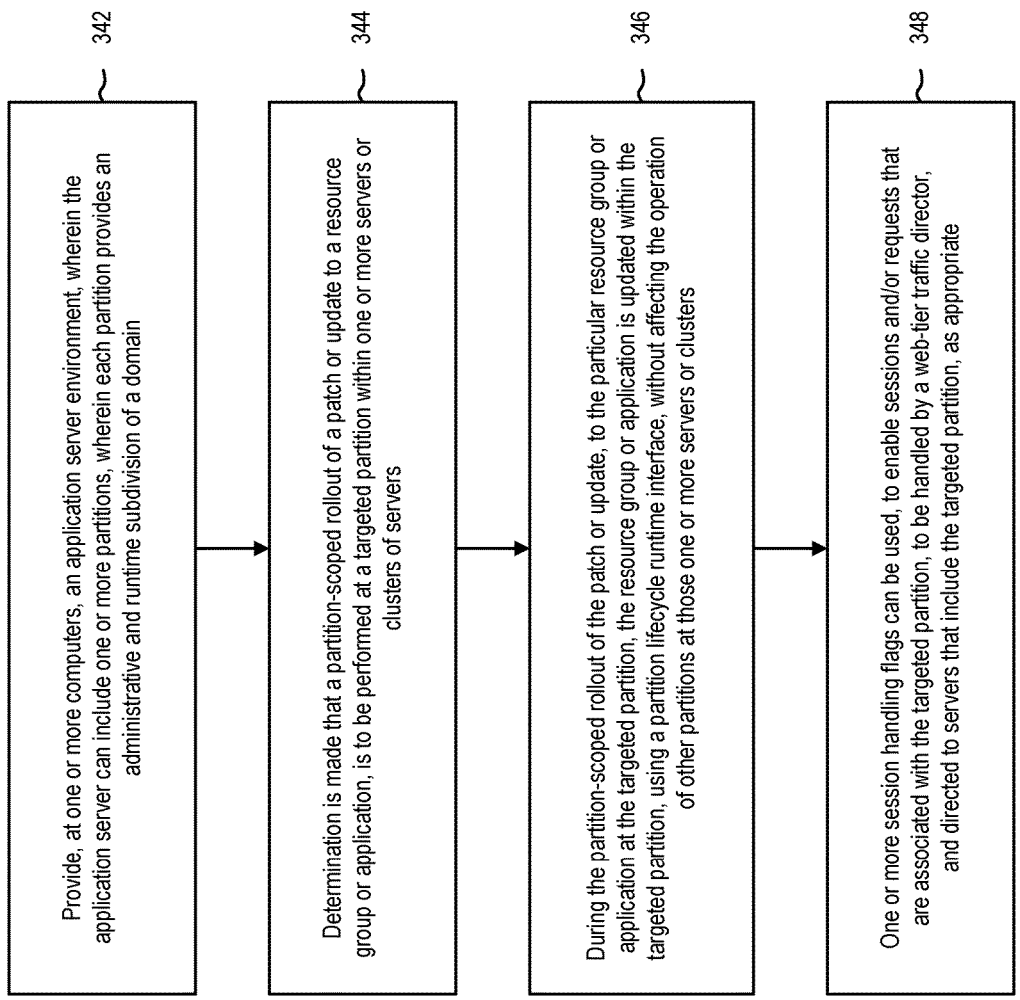
FIG. 6 illustrates a method of providing partition-scoped patching in an application server, cloud, or other environment, in accordance with an embodiment.

FIG. 6 illustrates a method of providing partition-scoped patching in an application server, cloud, or other environment, in accordance with an embodiment.

As illustrated in FIG. 6, in accordance with an embodiment, at step 342, an application server environment is provided at one or more computers, wherein the application server can include one or more partitions, wherein each partition provides an administrative and runtime subdivision of a domain.

At step 344, a determination is made that a partition-scoped rollout of a patch or update, to a resource group or application, is to be performed at a targeted partition within a plurality of servers or clusters of servers.

At step 346, during the partition-scoped rollout of the patch or update, to the particular resource group or application at the targeted partition, the resource group or application can be updated within a targeted partition, using a partition lifecycle runtime interface, without affecting the operation of other partitions at those servers or clusters of servers.

At step 348, one or more session handling flags can be used, to enable sessions and/or requests that are associated with the targeted partition, to be handled by a traffic director, and directed to servers that include the targeted partition, as appropriate.

PaaS Patching Workflow

In accordance with an embodiment, in a PaaS environment where, for example, an application update may require shutdown of a resource group on a server, the patching workflow can operate as follows:

Initialize session handling flags to the targeted partition.

Iterate through each node that contains a targeted partition.

Iterate through each server on the node, that contains a targeted partition.

Quiesce traffic to the partition on the server using a virtual target URI, by contacting the traffic director.

Perform a graceful shutdown the targeted partitions on that single, specific server that contain applications to be updated, to trigger any additional high-availability (HA) features, and ensure that application requests will be appropriately handled on other servers in the cluster.

Update the application source (for example, by moving current source to backup location and copying patched source to current location).

Perform a targeted redeploy of the application on the specific targeted partition and server, which clears internal application cache files to ensure application is fully reloaded upon restart.

Update session handling flags, indicating a "patched" status for the partition.

Start all targeted partitions on the server.

Move on to next server, before moving on to next node.

Disable session handling flags when done.

SaaS Patching Workflow

In accordance with an embodiment, in a SaaS environment where, for example, an application may be made available for several partitions to consume by extending a resource group template, and wherein an application update may need to accommodate the use of global resource groups, and/or several resource groups on each server, the patching workflow can operate as follows:

If a global resource group is being updated, initialize session handling flags for the server; otherwise initialize session handling flags to all of the affected partitions.

Iterate through each node that contains a targeted resource group or partition.

Iterate through each server that contains a targeted resource group or partition.

If a global resource group is being updated, then quiesce traffic to the server by contacting the traffic director, and perform a graceful shutdown of the server.

If no global resource group is being updated, then quiesce traffic to the partition on the server using a virtual target URI, by contacting the traffic director; and perform a graceful shutdown of the targeted partition on that single specific server that contains applications to be updated, to trigger any additional high-availability (HA) features, and ensure that application requests will be appropriately handled on other servers in the cluster.

Update the application source (for example, by moving current source to backup location and copying patched source to current location).

If a global resource group is being updated, start the server in Admin mode; and update session handling flags, indicating a "patched" status for the server.

Perform a targeted redeploy of the application on the specific targeted partition and server, which clears internal application cache files to ensure application is fully reloaded upon restart.

If a global resource group is being updated, resume the server so that it is available in RUNNING mode; and contact the traffic director to reactivate the server and remove it from quiesced status.

If no global resource group is being updated, start all targeted partitions on the server.

Move on to next server, before moving on to next node.

Disable session handling flags when done.

The above examples of various partition-scoped rollout scenarios, and patching workflows, are provided by way of example, to illustrate various use cases. In accordance with other embodiments and use cases, the system and methods described herein can be used to enable other types of partition-scoped rollout scenarios or patching workflows.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, while several embodiments described above illustrate a multitenant application server environment, embodiments can also be used in other types of application server, cloud, or other computing environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for partition-scoped patching in an application server environment, comprising:
    a computer that includes an application server environment that supports use of one or more partitions,
        wherein each partition provides an administrative and runtime subdivision of an application server domain,
        wherein the one or more partitions are provided at servers or clusters of servers, and
        wherein each server that provides the one or more partitions includes a resource group or application for use with the one or more partitions;
    a patch orchestrator and partition lifecycle runtime interface, that enables a partition-scoped rollout of a patch to a resource group or application within a targeted partition of the one or more partitions at the servers or clusters of servers, to update the resource group or application within the targeted partition, wherein the patch is applied to the resource group or application within the targeted partition at the servers or clusters of servers, using the partition lifecycle runtime interface, without affecting the operation of other partitions at those servers or clusters of servers; and
    wherein one or more session handling flags are used, during the partition-scoped rollout, to propagate session information and control the handling of sessions and requests associated with the targeted partition by a traffic director, to the servers or clusters of servers that include the targeted partition, including, for each server to be patched:
        shutting down the targeted partition at the server,
        updating a version of the resource group or application within the targeted partition,
        restarting only the targeted partition and the updated version of the resource group and application within the targeted partition, and
        while the server is shutdown, flagging a status of the server to the traffic director indicative of that server's unavailability, to enable the traffic director to contact another of the servers to process requests associated with the targeted partition.

2. The system of claim 1, wherein the patch is applied to the resource group or application within the targeted partition at the servers or clusters of servers, using a rolling restart process.

3. The system of claim 1, wherein the one or more session handling flags are used in association with a web-tier traffic director, to control how the sessions and requests that are associated with the targeted partition, are associated with or directed to appropriate servers that include the targeted partition.

4. The system of claim 1, wherein the partition-scoped rollout is provided within a cloud environment having a plurality of tenants, and wherein each tenant can be associated with at least one partition.

5. A method for partition-scoped patching in an application server environment, comprising:
providing, at a computer, an application server having one or more partitions,
wherein each partition provides an administrative and runtime subdivision of an application server domain,
wherein the one or more partitions are provided at servers or clusters of servers, and
wherein each server that provides the one or more partitions includes a resource group or application for use with the one or more partitions;
performing, using a patch orchestrator and partition lifecycle runtime interface, a partition-scoped rollout of a patch to a resource group or application within a targeted partition of the one or more partitions at the servers or clusters of servers, to update the resource group or application within the targeted partition, wherein the patch is applied to the resource group or application within the targeted partition at the servers or clusters of servers, using the partition lifecycle runtime interface, without affecting the operation of other partitions at those servers or clusters of servers; and
wherein one or more session handling flags are used, during the partition-scoped rollout, to propagate session information and control the handling of sessions and requests associated with the targeted partition by a traffic director, to the servers or clusters of servers that include the targeted partition, including, for each server to be patched:
shutting down the targeted partition at the server,
updating a version of the resource group or application within the targeted partition,
restarting only the targeted partition and the updated version of the resource group and application within the targeted partition, and
while the server is shutdown, flagging a status of the server to the traffic director indicative of that server's unavailability, to enable the traffic director to contact another of the servers to process requests associated with the targeted partition.

6. The method of claim 5, wherein the patch is applied to the resource group or application within the targeted partition at the servers or clusters of servers, using a rolling restart process.

7. The method of claim 5, wherein the one or more session handling flags are used in association with a web-tier traffic director, to control how the sessions and requests that are associated with the targeted partition, are associated with or directed to appropriate servers that include the targeted partition.

8. The method of claim 5, wherein the partition-scoped rollout is provided within a cloud environment having a plurality of tenants, and wherein each tenant can be associated with at least one partition.

9. A non-transitory computer readable storage medium, including instructions stored thereon which when read and executed by one or more computers cause the one or more computers to perform a method comprising:
providing, at a computer, an application server having one or more partitions,
wherein each partition provides an administrative and runtime subdivision of an application server domain,
wherein the one or more partitions are provided at servers or clusters of servers, and
wherein each server that provides the one or more partitions includes a resource group or application for use with the one or more partitions;
performing, using a patch orchestrator and partition lifecycle runtime interface, a partition-scoped rollout of a patch to a resource group or application within a targeted partition of the one or more partitions at the servers or clusters of servers, to update the resource group or application within the targeted partition, wherein the patch is applied to the resource group or application within the targeted partition at the servers or clusters of servers, using the partition lifecycle runtime interface, without affecting the operation of other partitions at those servers or clusters of servers; and
wherein one or more session handling flags are used, during the partition-scoped rollout, to propagate session information and control the handling of sessions and requests associated with the targeted partition by a traffic director, to the servers or clusters of servers that include the targeted partition, including, for each server to be patched:
shutting down the targeted partition at the server,
updating a version of the resource group or application within the targeted partition,
restarting only the targeted partition and the updated version of the resource group and application within the targeted partition, and
while the server is shutdown, flagging a status of the server to the traffic director indicative of that server's unavailability, to enable the traffic director to contact another of the servers to process requests associated with the targeted partition.

10. The non-transitory computer readable storage medium of claim 9, wherein the patch is applied to the resource group or application within the targeted partition at the servers or clusters of servers, using a rolling restart process.

11. The non-transitory computer readable storage medium of claim 9, wherein the one or more session handling flags are used in association with a web-tier traffic director, to control how the sessions and requests that are associated with the targeted partition, are associated with or directed to appropriate servers that include the targeted partition.

12. The non-transitory computer readable storage medium of claim 9, wherein the partition-scoped rollout is provided within a cloud environment having a plurality of tenants, and wherein each tenant can be associated with at least one partition.

* * * * *